UNITED STATES PATENT OFFICE.

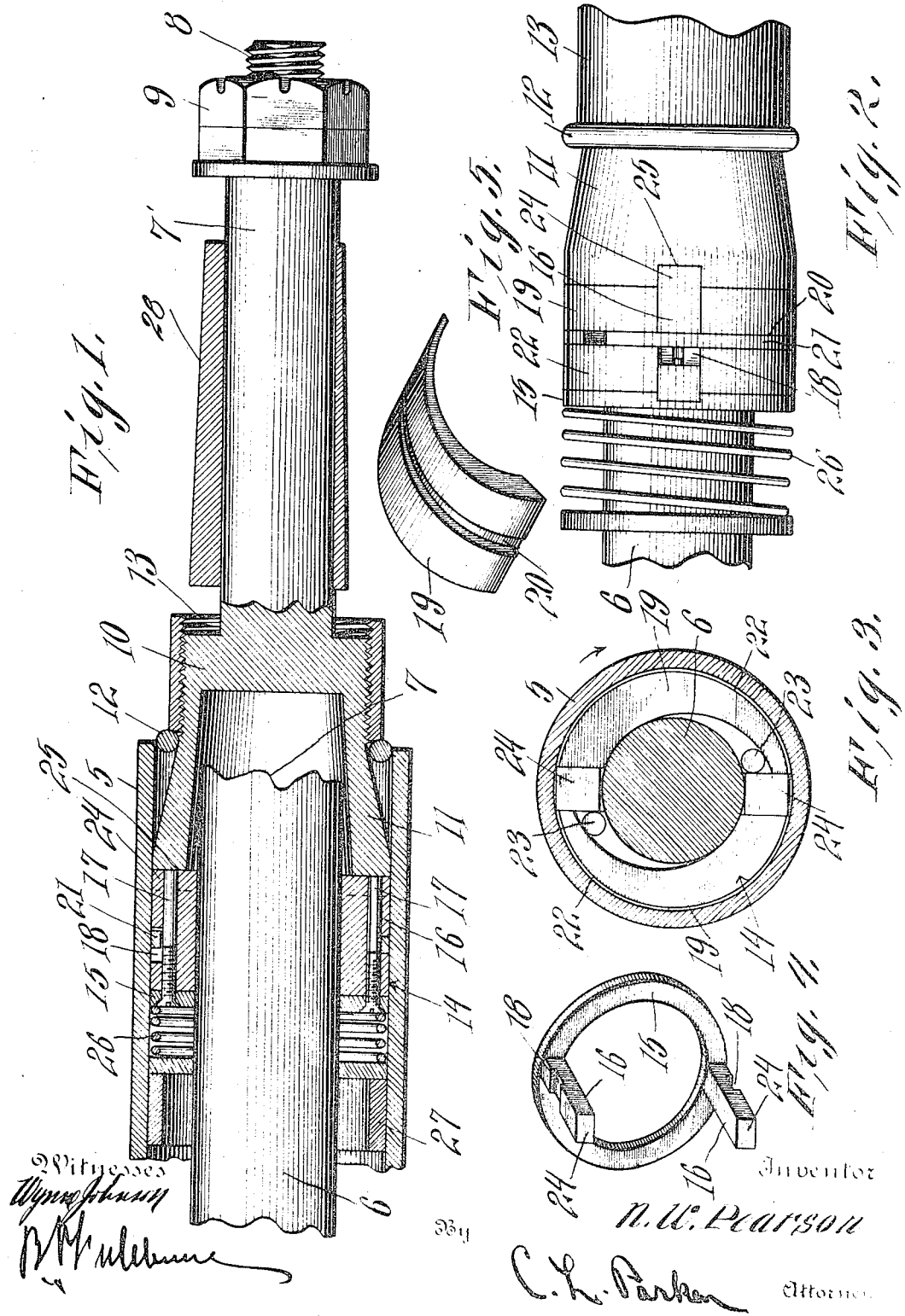

NEWTON W. PEARSON, OF SYLVANIA, GEORGIA.

AXLE ATTACHMENT FOR AUTOMOBILES.

1,144,562.  Specification of Letters Patent.  Patented June 29, 1915.

Application filed March 11, 1915. Serial No. 13,769.

*To all whom it may concern:*

Be it known that I, NEWTON W. PEARSON, a citizen of the United States, residing at Sylvania, in the county of Screven and State of Georgia, have invented certain new and useful Improvements in Axle Attachments for Automobiles, of which the following is a specification.

My invention relates to an axle attachment for connection with the axle casing or axle of an automobile or other vehicle, particularly the rear axle casing or axle thereof, when such axle breaks, whereby the wheel which has become disconnected from the rear axle is secured in place and the automobile or other vehicle may be conveniently conducted to a place of repair, such as a garage.

An important object of the invention is to provide means for locking the broken axle section against rotation and securing the wheel to the broken axle section, whereby the differential gear will operate to rotate the other wheel, to propel the vehicle or automobile.

A further object of the invention is to provide means for securely attaching an auxiliary spindle to the broken end of the axle section, with or without holding the axle section against rotation or engaging therewith.

A further object of the invention is to provide apparatus of the above mentioned character, which is simple in construction, strong, durable, and convenient in use.

Other objects and advantages of the invention will be apparent during the course of the following description.

As is well known, the rear axles of automobiles, particularly in the heavier cars, not infrequently break near the spindle, carrying the wheel. When this occurs it is customary to connect a beam, serving as a ski, with the rear portion of the automobile, which holds the rear axle more or less horizontal, while the car is towed in. As the rear axle of practically all automobiles is formed in two axle sections, connected with and driven by a differential gear, when one of these axle sections break, the broken axle section is free to spin whereby the engine cannot drive the other axle section to propel the vehicle. This ordinarily necessitates the towing of the automobile to a place of repair, such as a garage.

My apparatus consists generally of an auxiliary spindle having means for attaching the same to the axle casing or to the axle within the axle casing. Means are also provided for holding the broken axle section against rotation, preferably by clamping it with the axle casing, whereby the engine operating through the differential gear will rotate the wheel carried by the other axle section for propelling the automobile to a place of repair.

In the accompanying drawings forming a part of this specification and in which like numerals are employed to designate like parts throughout the same, Figure 1 is a central longitudinal sectional view through apparatus embodying my invention, Fig. 2 is a fragmentary side elevation of the clutch mechanism embodied therein, Fig. 3 is an outer end view of the clutch mechanism, Fig. 4 is a perspective view of the frame of the clutch mechanism, and, Fig. 5 is a similar view of a clutch segment.

In the drawings, wherein for the purpose of illustration is shown a preferred embodiment of my invention, the numeral 5 designates the rear axle casing, of any well known or preferred type, receiving the two axle sections 6, only one axle section being shown. These axle sections are connected with and driven by a differential (not shown) as is well known. For the purpose of illustration the spindle is considered as broken from the outer end of the axle 6, as shown at 7.

My apparatus embodies an auxiliary spindle 7' having an outer screw-threaded end 8, for carrying a nut or nuts 9, preventing the wheel when arranged therefrom from sliding off of the same.

Rigidly connected with the inner end of the auxiliary spindle 7' and preferably formed integral therewith, while this is immaterial, is a tubular coupling 10, of substantially greater diameter than the auxiliary spindle and preferably having an inner tapered portion 11, increasing in diameter inwardly. The tapered portion 11 of the coupling 10 preferably fits snugly within the axle casing 5. The tubular coupling 10 is clamped or rigidly connected with the outer end of the axle casing 5 by means of a split ring 12, adapted to be forced between the casing 5 and the coupling to engage with the tapered outer wall of the portion 11 thereof, as shown. A locking ring 13 has screw-threaded engagement with the outer end of the sleeve 10 and engages the expansible ring 12 which upon being forced inwardly upon the tapered portion 11 expands and by having clamping engagement with the axle casing 5 and the portion 11 serves to lock these parts together so that its coupling and its auxiliary spindle cannot partake of perceptible longitudinal movement with respect to the axle casing. In Fig. 1, the axle is shown as projecting into the tubular coupling 10 while if the axle should be broken off farther inwardly it is obvious that it need not engage with the coupling 10 and that it would in no way effect the connection between the axle and the axle casing Means are provided to lock the axle section 6 to the relatively stationary axle casing 5 against rotation, the same embodying an expansible clutch mechanism, designated as a whole by the numeral 14. This clutch mechanism embodies a clutch frame including a ring 15, adapted to receive the axle 6, and having fingers or lugs 16 rigidly secured thereto by means of screws 17 or the like. These lugs are provided upon their outer sides with transverse grooves 18, for a purpose to be described.

The clutch mechanism further comprises expansible segments 19, more clearly shown in Figs. 2 and 3. These expansible segments 19 are arranged upon opposite sides of the lugs 16 and normally engage therewith, the expansible segments being provided upon their outer surfaces with grooves 20, in registration with the transverse grooves 18.

Arranged within the grooves 20 and 18 is a curved spring 21, serving to hold these parts together but permitting of the outward movement of the segments 19. As more clearly shown in Fig. 3, the segments 19 surround the axle section 6, and have inner cam faces 22, with clutch elements or rolls 23, engaging the cam faces 22 and axle section 6. It is thus apparent that when the clutch mechanism is turned clockwise, as indicated by the arrow in Fig. 3, the clutch elements or rollers 23 traveling into engagement with the inner ends of the cam faces 22, cause the segments 19 to expand or move outwardly, whereby they have clamping engagement with the inner side of the axle casing 5, and the axle section 6, whereby the axle section 6 and axle casing are locked together and rotation of the axle prevented.

As more clearly shown in Fig. 2, the lugs 16 extend outwardly beyond the segments 19, as shown at 24.

The inner end of the portion 11 of coupling 10 is provided with recesses 25, receiving the ends 24 of the lugs, and when the parts are assembled as illustrated in Figs. 1 and 2, the auxiliary spindle 7' serves as a tool for rotating or operating the clutch mechanism whereby it will serve to lock the casing and axle sections together. I preferably arrange a spring 26 between the clutch mechanism 12 and the ball bearing retainer 27, the ball bearings being of course removed prior to the application of my apparatus to the broken axle section.

In the use of the apparatus, upon the spindle of the axle section being broken away as shown in Fig. 1, the roller bearings are first removed from the axle casing. The coil spring 26 is first passed over the outer end of the axle section 6 and moved back into engagement with the bearing retainer 27. The clutch mechanism 12 is then slipped upon the axle section 6 and the clutch rollers or elements 23 arranged in place (the cam faces 22 of the segments 19 being reversed depending upon whether the apparatus is applied to the right or left axle section.) The coupling 10 carried by the auxiliary spindle is now placed in engagement with the clutch mechanism 14 and the ends 24 of the lugs 16 enter the recesses 25. By means of the auxiliary spindle the clutch mechanism may be moved inwardly upon the axle section 6 and the coupling 11 arranged suitably within the axle casing 5, subsequent to which the auxiliary spindle 7' is turned, for expanding the clutch mechanism and locking the axle section 6 with the axle casing 5. The lock sleeve 13 is now rotated to lock the coupling 10 to the axle casing 5, as above explained. The spindle which has been broken from the axle is now removed from the hub of the wheel. The hub bearing bushing 28 is placed in the hub and pressed firmly therein. The wheel is now placed upon the auxiliary spindle 7', which should be suitably lubricated and the nuts 9 screwed up, care being taken not to allow these nuts to clamp with the wheel for preventing the rotation of the wheel. It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described the invention, I claim:—

1. The combination with an axle casing and an axle section therein, of an expansible clutch mechanism arranged between the axle section and axle casing to lock these parts together, and an auxiliary spindle having means of attachment with the axle casing.

2. The combination with an axle casing, of a spindle having a tapered extension provided with a screw-threaded portion and adapted to be inserted into the end of the axle casing, a split ring arranged upon the tapered extension to engage with the inner side of the axle casing, and a clamping ring engaging the screw-threads of the tapered extension and engaging with the split ring.

3. In apparatus of the character described, an auxiliary spindle having one end adapted to be inserted into the end of an axle casing in proximity to a broken end of an axle section, means to lock the auxiliary spindle with the axle casing, means arranged within the axle casing for locking the axle section with the axle casing against rotation with relation thereto, and means whereby the locking means may be rendered active by a manipulation of the auxiliary spindle.

4. In apparatus of the character described, an auxiliary spindle having its inner end adapted to be inserted within the end of an axle casing in proximity to a broken end of an axle section, means arranged between the inner end of the auxiliary spindle and the axle casing to lock the same together, expansible clutch mechanism arranged within the axle casing and surrounding the axle section to lock the axle section with the axle casing against rotation with relation thereto, and means constituting operative detachable connection between the inner end of the auxiliary spindle and the expansible clutch mechanism.

5. In apparatus of the character described, an auxiliary spindle having its inner end adapted to be inserted within an axle casing in proximity to a broken end of an axle section, said inner end of the auxiliary spindle being provided with notches; an expansible clutch means arranged between the axle section and the axle casing to lock them together; a plurality of lugs secured to the expansible clutch means and adapted to enter said notches; and means to lock the auxiliary spindle with the axle casing.

In testimony whereof I affix my signature in presence of two witnesses.

NEWTON W. PEARSON.

Witnesses:
C. O. STEWART,
F. B. NEWTON.